(12) United States Patent
Itoh

(10) Patent No.: US 7,836,985 B2
(45) Date of Patent: Nov. 23, 2010

(54) MOTIVE POWER OUTPUT DEVICE, VEHICLE EQUIPPED WITH THE DEVICE, AND CONTROL METHOD FOR MOTIVE POWER OUTPUT DEVICE

(75) Inventor: Takao Itoh, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 92 days.

(21) Appl. No.: 12/404,644

(22) Filed: Mar. 16, 2009

(65) Prior Publication Data

US 2009/0243518 A1 Oct. 1, 2009

(30) Foreign Application Priority Data

Apr. 1, 2008 (JP) ............................. 2008-095351

(51) Int. Cl.
*B60K 6/20* (2007.10)

(52) U.S. Cl. .................. 180/65.21; 180/65.265; 180/65.29

(58) Field of Classification Search .............. 180/65.1, 180/65.21, 65.28, 65.29, 65.285, 65.265, 180/65.23, 65.275, 65.31; 701/22, 20; 318/139, 318/154, 151

See application file for complete search history.

(56) References Cited

U.S. PATENT DOCUMENTS

| | | | |
|---|---|---|---|
| 5,075,616 A * | 12/1991 | Mitsui ......................... 322/10 |
| 5,847,520 A * | 12/1998 | Theurillat et al. ........... 318/151 |
| 5,924,505 A * | 7/1999 | Theurillat et al. ......... 180/65.23 |
| 6,518,736 B2 * | 2/2003 | Sasaki et al. .................. 322/16 |
| 6,707,275 B2 * | 3/2004 | Okahara et al. ............... 322/24 |
| 6,924,629 B1 * | 8/2005 | Mueller et al. ................ 322/28 |
| 7,466,108 B2 * | 12/2008 | Suzuki et al. ................. 322/37 |
| 7,653,466 B2 * | 1/2010 | Egami et al. .................. 701/22 |
| 2007/0296358 A1 * | 12/2007 | Sato et al. .................... 318/139 |
| 2009/0151193 A1 * | 6/2009 | Moon et al. ................. 312/229 |
| 2009/0212625 A1 * | 8/2009 | Nishimura .................. 307/10.1 |
| 2010/0065349 A1 * | 3/2010 | Ichikawa et al. ........... 180/65.1 |

FOREIGN PATENT DOCUMENTS

| | | |
|---|---|---|
| JP | 2001-115913 A | 4/2001 |
| JP | 2006-187169 A | 7/2006 |
| JP | 2007-099117 A | 4/2007 |
| JP | 2007-326408 A | 12/2007 |

* cited by examiner

*Primary Examiner*—Hau V Phan
(74) *Attorney, Agent, or Firm*—Kenyon & Kenyon LLP

(57) ABSTRACT

A torque command for a first motor is set by setting a maximum torque restriction and a minimum torque restriction in a range, where the sum of the torques output from the first and second motors to a driving shaft be within a range from 0 to a required torque, the sum of the electric powers input from or output to the first and second motors be within a range of input and output restrictions of a battery, and the torque of the second motor be within a range from a value smaller than 0 by the permissible maximum amount of change to the sum of the permissible maximum amount of change and the previous torque command. A torque command for the second motor is set so that the required torque is output to the driving shaft within a range of the input and output restrictions of the battery.

5 Claims, 8 Drawing Sheets

MOTIVE POWER OUTPUT DEVICE, VEHICLE EQUIPPED WITH THE DEVICE, AND CONTROL METHOD FOR MOTIVE POWER OUTPUT DEVICE

INCORPORATION BY REFERENCE

The disclosure of Japanese Patent Application No. 2008-095351 filed on Apr. 1, 2008 including the specification, drawings and abstract is incorporated herein by reference in its entirety.

BACKGROUND OF THE INVENTION

1. Field of the Invention

The invention relates to a motive power output device, and a vehicle equipped with the device as well as a control method for the motive power output device.

2. Description of the Related Art

There has been proposed a motive power output device which includes an engine, a planetary gear whose carrier is connected to a crankshaft of the engine, and whose ring gear is connected to a driving shaft linked to an axle shaft, a motor MG1 connected to a sun gear of the planetary gear, and a motor MG2 connected to the driving shaft, and which controls the engine and two electric motors MG1, MG2 so as to output a required torque that is required for the traveling of the vehicle while operating the engine on a steady travel-time operation line within a range of restriction of the charging and discharging of a battery (e.g., see Japanese Patent Application Publication No. 2000-115913 (JP-A-2000-115913)). This device sets a target rotation speed and a target torque as points of operation of the engine, and sets a target torque of the motor MG1 so that the engine rotates at the target rotation speed, and sets and controls the torque of the motor MG1 by restricting the target torque by using a maximum restriction torque value obtained from the input/output restriction which is a maximum electric power that can be charged into or discharged from the battery.

However, in the foregoing motive power output device, when the required torque sharply changes, it sometimes becomes difficult to drive the two motors at a proper drive point. When the torque from a motor is to be sharply changed, it is often the case that the maximum amount of change in the torque per unit time is pre-set so as to avoid overcurrent flowing to an inverter that drives the motor. Therefore, when the torque of the motor is to be changed, the maximum amount of change in the torque needs to be taken into account in addition to considering the rated value of the motor, in order to more properly drive the motor. In the device equipped with a voltage boost circuit that boosts the voltage of the electric power from a battery and supplies the boosted power to the motors, the state of operation of the voltage boost circuit varies between when the voltage from the battery is directly supplied to the motor side without operating the voltage boost circuit at all and when a voltage higher than the voltage from the battery is supplied to the motor side via the voltage boost circuit. Therefore, the amount of change in the current flowing through the inverter per unit time varies, and the maximum amount of change in the torque of the motor per unit time also varies.

SUMMARY OF THE INVENTION

In the motive power output device, the vehicle equipped with this device, and the motive power output device control method of the invention, an electric motor and an electric generator are driven by taking into account not only an input/output restriction of an electric storage device, such as a secondary battery or the like, but also the amount of change in the torque output from the electric motor.

A motive power output device in accordance with a first aspect of the invention relates to a motive power output device that outputs motive power to a driving shaft, and includes: an internal combustion engine; an electric generator that inputs and outputs motive power; a three-shaft type motive power input/output device which is connected to three shafts that are the driving shaft, an output shaft of the internal combustion engine, and a rotating shaft of the electric generator, and which inputs or outputs motive power from or to one of the three shafts based on the motive power input from or output to two shafts of the three shafts; an electric motor that inputs and outputs motive power from and to the driving shaft; an electric storage device capable of allowing electric power to be sent and received between the electric generator and the electric motor; an input/output restriction setting device that sets an input/output restriction as a maximum electric power that is allowed to be charged into or discharged from the electric storage device based on a state of the electric storage device; a required torque setting device that sets a required torque that is required of the driving shaft; and a control device which operates the internal combustion engine based on a predetermined constraint in a range where setting conditions, including an input/output condition that a sum of an electric generator input/output electric power input to or output from the electric generator and an electric motor input/output electric power input to or output from the electric motor be within a range between the input and output restrictions set by the input/output restriction setting device, a drive torque condition that a sum of a torque that acts on the driving shaft based on a torque output from the electric generator and a torque that acts on the driving shaft based on a torque output from the electric motor be within a range from a value 0 to the required torque set by the required torque setting device, and an electric motor torque alteration condition that a torque output from the electric motor be within a permissible torque range in which alteration from the torque that the electric motor is outputting is permitted, are satisfied, and which also controls the internal combustion engine, the electric generator, and the electric motor so that the required torque set by the required torque setting device is output to the driving shaft.

The motive power output device in accordance with the first aspect of the invention operates the internal combustion engine based on a predetermined constraint in a range where setting conditions, including the input/output condition that the sum of the electric generator input/output electric power input to or output from the electric generator and the electric motor input/output electric power input to or output from the electric motor be within a range between the input and output restrictions set as a maximum electric power that may be charged into or discharged from the electric storage device, the drive torque condition that the sum of the torque that acts on the driving shaft based on the torque output from the electric generator and the torque that acts on the driving shaft based on the torque output from the electric motor be within a range from the value 0 to the required torque required of the driving shaft, and the electric motor torque alteration condition that the torque output from the electric motor be within a permissible torque range in which alteration from the torque that the electric motor is outputting is permitted, are satisfied. Furthermore, the motive power output device controls the internal combustion engine, the electric generator, and the electric motor so that the required torque is output to the driving shaft. Therefore, the internal combustion engine, the electric generator, and the electric motor can be driven by taking into account not only the input and output restrictions of the electric storage device but also the permissible torque range that is permitted when the torque of the electric motor is altered. As a result, the electric generator and the electric motor can be more properly driven.

In the motive power output device in accordance with the first aspect of the invention, the control device may be a device that controls the internal combustion engine, the electric generator, and the electric motor, using as one of the setting conditions an electric generator torque alteration condition that the torque that the electric generator outputs be within a range in which alteration from the torque that the electric generator is outputting is permitted. This construction makes it possible to drive the electric generator and the electric motor by taking into account not only the permissible torque range that is permitted at the time of alteration of the torque of the electric motor but also the range of the torque that is permitted at the time of alteration of the torque of the electric generator, so that the electric generator and the electric motor can be more properly driven.

Besides, in the motive power output device in accordance with the first aspect of the invention, the electric motor torque alteration condition may be a condition in which the permissible torque range is a range defined by a torque that is larger by an alteration torque than the torque that the electric motor is outputting and a torque that is smaller than the value 0 by the alteration torque. In this case, the motive power output device may further include a voltage adjustment device that allows electric power to be sent and received between the electric storage device, the electric generator and the electric motor by adjusting the voltage of a side of the electric generator and the electric motor relative to the voltage of a side of the electric storage device, and the electric motor torque alteration condition may be a condition in which the permissible torque range is a range obtained by using a first toque as the alteration torque when the voltage of the side of the electric generator and the electric motor is made equal to the voltage of the side of the electric storage device by the voltage adjustment device, and may be a condition in which the permissible torque range is a range obtained by using a second torque that is larger than the first torque as the alteration torque when the voltage of the side of the electric generator and the electric motor is made higher than the voltage of the side of the electric storage device by the voltage adjustment device. This construction makes it possible to more properly drive the electric generator and the electric motor according to the operating state of the voltage adjustment device.

Furthermore, in the motive power output device in accordance with the first aspect of the invention, the control device may set a target operation point of the internal combustion engine based on the set required torque and the predetermined constraint, and may operate the internal combustion engine at the set target operation point within a range where the setting conditions are satisfied, and may set a torque command of the electric generator and a torque command of the electric motor so that the set required torque is output to the driving shaft, and may drive the electric generator and the electric motor by the set torque commands, and may control the internal combustion engine, the electric generator, and the electric motor so that the internal combustion engine is operated by the predetermined constraint.

A vehicle in accordance with a second aspect of the invention is equipped with any one of the foregoing motive power output devices in accordance with the first aspect of the invention, which is basically a motive power output device that outputs motive power to a driving shaft, and that includes: an internal combustion engine; an electric generator that inputs and outputs motive power; a three-shaft type motive power input/output device which is connected to three shafts that are the driving shaft, an output shaft of the internal combustion engine, and a rotating shaft of the electric generator, and which inputs or outputs motive power from or to one of the three shafts based on the motive power input from or output to two shafts of the three shafts; an electric motor that inputs and outputs motive power from and to the driving shaft; an electric storage device capable of allowing electric power to be sent and received between the electric generator and the electric motor; an input/output restriction setting device that sets an input/output restriction as a maximum electric power that is allowed to be charged into or discharged from the electric storage device based on a state of the electric storage device; a required torque setting device that sets a required torque that is required of the driving shaft; and a control device which operates the internal combustion engine based on a predetermined constraint in a range where setting conditions, including an input/output condition that a sum of an electric generator input/output electric power input to or output from the electric generator and an electric motor input/output electric power input to or output from the electric motor be within a range between the input and output restrictions set by the input/output restriction setting device, a drive torque condition that a sum of a torque that acts on the driving shaft based on a torque output from the electric generator and a torque that acts on the driving shaft based on a torque output from the electric motor be within a range from a value 0 to the required torque set by the required torque setting device, and an electric motor torque alteration condition that a torque output from the electric motor be within a permissible torque range in which alteration from the torque that the electric motor is outputting is permitted, are satisfied, and which also controls the internal combustion engine, the electric generator, and the electric motor so that the required torque set by the required torque setting device is output to the driving shaft, and an axle shaft of the vehicle is liked to the driving shaft.

Since the vehicle in accordance with the second aspect of the invention is equipped with any one of the foregoing motive power output devices in accordance with the first aspect of the invention, the vehicle achieves substantially the same effects as the those achieved by the motive power output device in accordance with the first aspect of the invention, for example, the effect of being able to drive the internal combustion engine, the electric generator, and the electric motor by taking into account not only the input and output restrictions of the electric storage device but also the permissible torque range that is permitted at the time of alteration of the torque of the electric motor, and, as a result of this effect, the effect of being able to more properly drive the electric generator and the electric motor, and the like.

A motive power output device control method in accordance with a third aspect of the invention is a control method for a motive power output device that includes: an internal combustion engine; an electric generator that inputs and outputs motive power; a three-shaft type motive power input/output device which is connected to three shafts that are the driving shaft, an output shaft of the internal combustion engine, and a rotating shaft of the electric generator, and which inputs or outputs motive power from or to one of the three shafts based on the motive power input from or output to two shafts of the three shafts; an electric motor that inputs and outputs motive power from and to the driving shaft; and an electric storage device capable of allowing electric power to be sent and received between the electric generator and the electric motor, the control method including: operating the internal combustion engine based on a predetermined constraint in a range where setting conditions, including an input/output condition that a sum of an electric generator input/output electric power input to or output from the electric generator and an electric motor input/output electric power input to or output from the electric motor be within a range between the input and output restrictions as a maximum electric power that is allowed to be charged into or discharged from the electric storage device based on a state of the electric storage device, a drive torque condition that a sum of a torque that acts on the driving shaft based on a torque output from the electric generator and a torque that acts on the driving shaft based on a torque output from the electric motor be within a range from a value 0 to a required torque that is required of the driving shaft, and an electric motor torque alteration condition that a torque output from the electric motor be within a permissible torque range in which alteration from the torque that the electric motor is outputting is permitted, are satisfied; and controlling the internal combustion engine, the electric generator, and the electric motor so that the required torque is output to the driving shaft.

The motive power output device control method in accordance with the third aspect of the invention operates the internal combustion engine based on a predetermined constraint in a range where setting conditions, including the input/output condition that the sum of the electric generator input/output electric power input to or output from the electric generator and the electric motor input/output electric power input to or output from the electric motor be within a range between the input and output restrictions set as a maximum electric power that may be charged into or discharged from the electric storage device, the drive torque condition that the sum of the torque that acts on the driving shaft based on the torque output from the electric generator and the torque that acts on the driving shaft based on the torque output from the electric motor be within a range from the value 0 to the required torque required of the driving shaft, and the electric motor torque alteration condition that the torque output from the electric motor be within a permissible torque range in which alteration from the torque that the electric motor is outputting is permitted, are satisfied. Furthermore, the control method controls the internal combustion engine, the electric generator, and the electric motor so that the required torque is output to the driving shaft. Therefore, the internal combustion engine, the electric generator, and the electric motor can be driven by taking into account not only the input and output restrictions of the electric storage device but also the permissible torque range that is permitted when the torque of the electric motor is altered. As a result, the electric generator and the electric motor can be more properly driven.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Next, best modes for carrying out the invention will be described with reference to embodiments.

Figure 1:
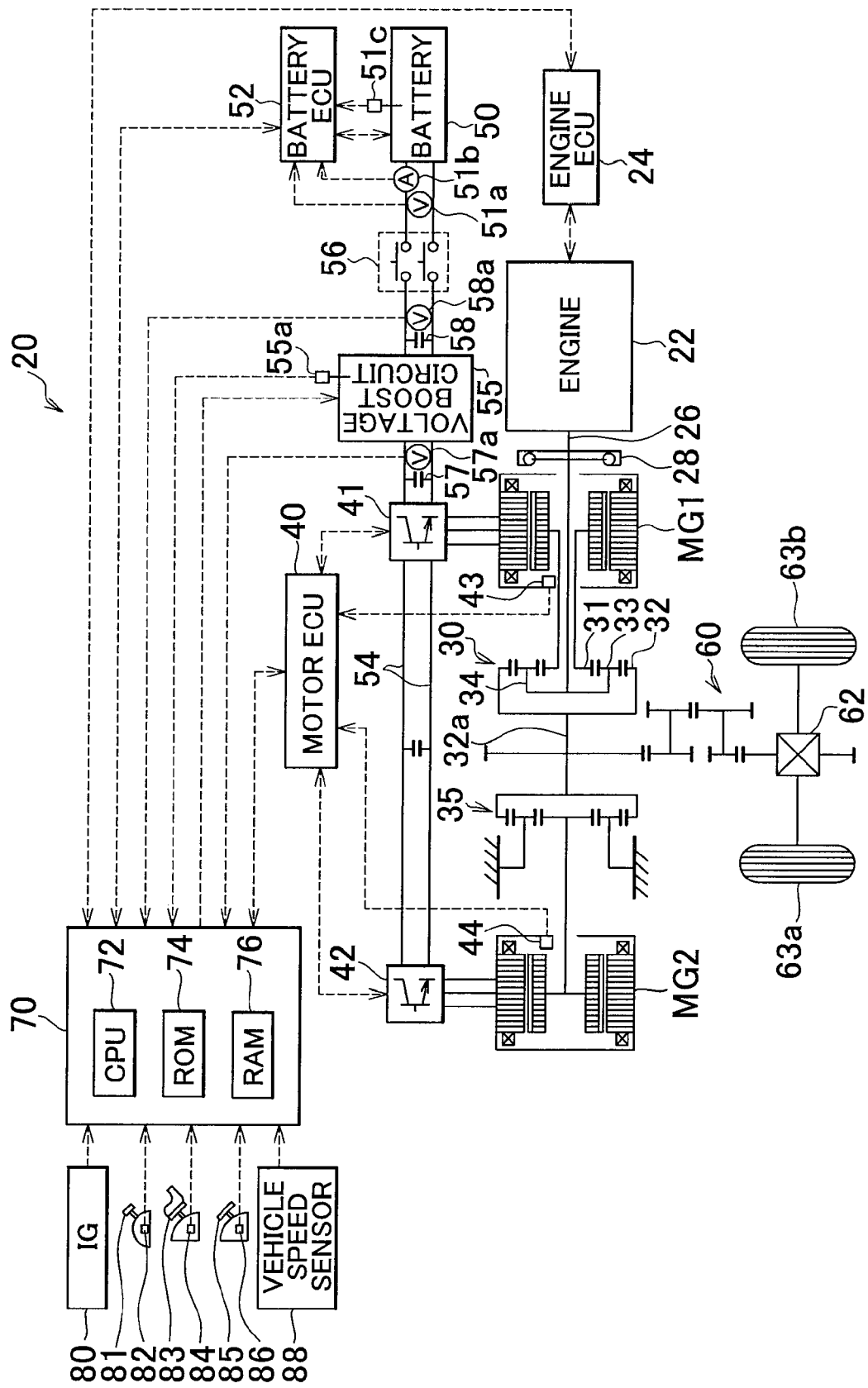
FIG. 1 is a construction diagram showing a general construction of a hybrid motor vehicle 20 that is an embodiment of the invention.
Figure 2:
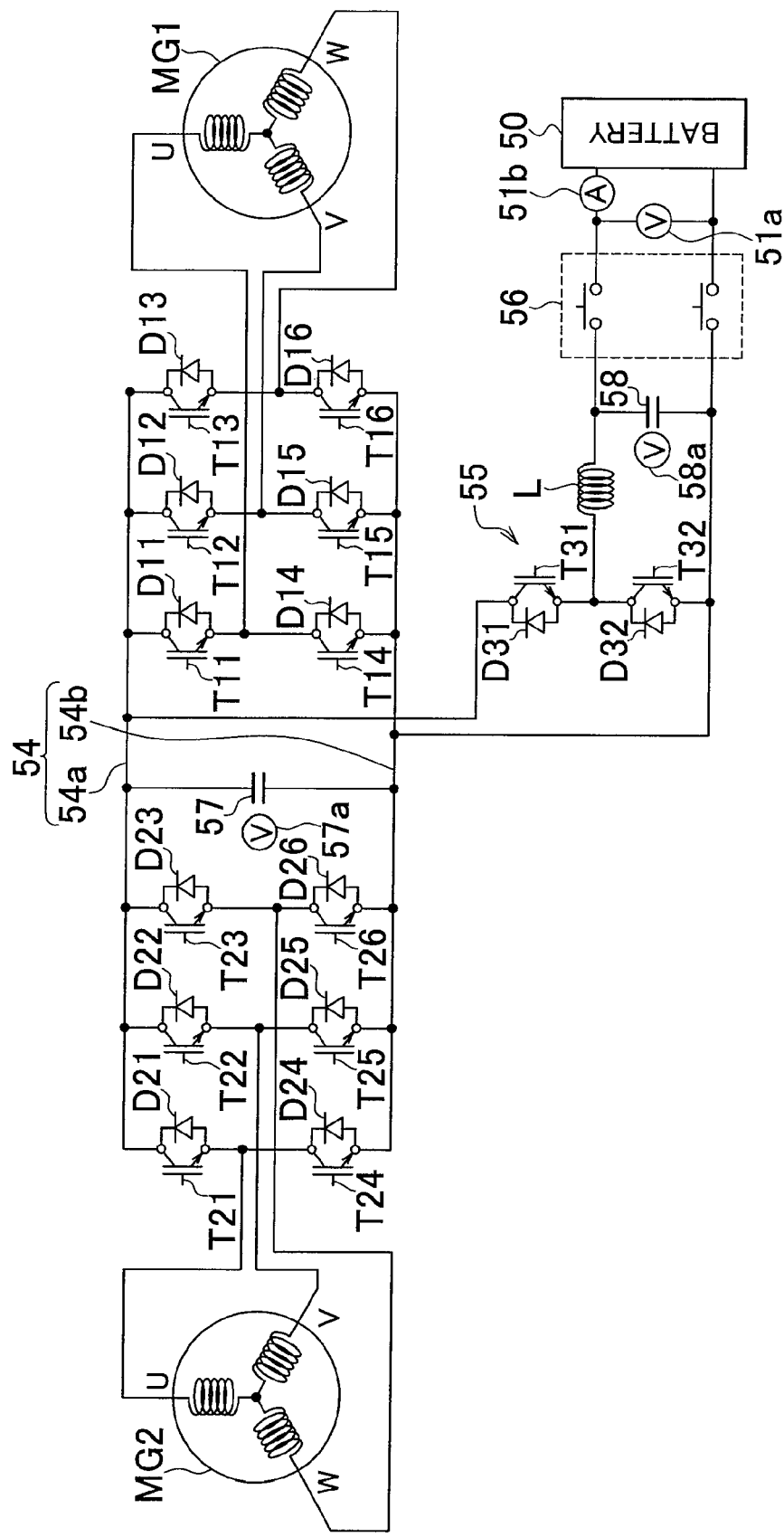
FIG. 2 is a construction diagram showing a general construction of an electric appliance drive system that includes motors MG1, MG2.

FIG. 1 is a construction diagram showing a general construction of a hybrid motor vehicle 20 that is an embodiment of the invention. FIG. 2 is a construction diagram showing a general construction of an electric appliance drive system that includes electric motors MG1, MG2. The hybrid motor vehicle 20 of the embodiment, as shown in FIG. 1, includes: an engine 22; a three-shaft type motive power distribution/integration mechanism 30 connected to a crankshaft 26 as an output shaft of the engine 22 via a damper 28; an electric motor MG1 capable of generating electric power which is connected to the motive power distribution/integration mechanism 30; an electric motor MG2 connected via a speed reduction gear 35 to a ring gear shaft 32a as a driving shaft connected to the motive power distribution/integration mechanism 30; inverters 41, 42 capable of converting direct current into alternating current and supplying the alternating current to the motors MG1, MG2; a voltage boost circuit 55 capable of converting the voltage of the electric power from the battery 50 and supplying the converted voltage to the inverters 41, 42; a system main relay 56 intervening between the battery 50 and the voltage boost circuit 55; and a hybrid-vehicle electronic control unit 70 that controls the entire vehicle.

The engine 22 is an internal combustion engine that outputs motive power from a hydrocarbon-based fuel, for example, gasoline, light oil or the like, and is subjected to various operation controls, such as a fuel injection control, an ignition control, an intake air amount adjustment control, etc., by an engine electronic control unit (hereinafter, termed the engine ECU) 24. Signals from various sensors that detect the state of operation of the engine 22 are input to the engine ECU 24, for example, a crank position signal from a crank position sensor (not shown) that detects the crank angle of the crankshaft 26 of the engine 22, and the like. The engine ECU 24 communicates with the hybrid-vehicle electronic control unit 70, and controls the operation of the engine 22 by a control signal from the hybrid-vehicle electronic control unit 70, and outputs to the hybrid-vehicle electronic control unit 70 data regarding the state of operation of the engine 22 according to need. In addition, the engine ECU 24 computes the rotation speed of the crankshaft 26, that is, the rotation speed Ne of the engine 22, on the basis of the crank position from a crank position sensor (not shown).

The motive power distribution/integration mechanism 30 is constructed as a planetary gear mechanism which includes a sun gear 31 of an external gear type, a ring gear 32 of an internal gear type disposed concentrically with the sun gear 31, a plurality of pinions 33 meshing with the sun gear 31 and also meshing with the ring gear 32, and a carrier 34 that retains the pinions 33 freely rotatably about their own axes and freely revolvably about the axis of the sun gear 31, and which performs a differential action using the sun gear 31, the ring gear 32 and the carrier 34 as rotary elements. The carrier 34 of the motive power distribution/integration mechanism 30 is connected to the crankshaft 26 of the engine 22, and the sun gear 31 thereof is connected to the motor MG1, and the ring gear 32 thereof is connected to the speed reduction gear 35 via the ring gear shaft 32a. When the motor MG1 functions as an electric generator, the motive power distribution/integration mechanism 30 distributes the motive power input from the engine 22 via the carrier 34 to the side of the sun gear 31 and the side of the ring gear 32 according to the gear ratio therebetween. When the motor MG1 functions as an electric motor, the motive power distribution/integration mechanism 30 integrates the motive power input from the engine 22 via the carrier 34 and the motive power input from the motor MG1 via the sun gear 31, and outputs the integrated power to the side of the ring gear 32. The motive power output to the ring gear 32 is output via the ring gear shaft 32a to a gear mechanism 60, and then to a differential gear 62, and finally to driving wheels 63a, 63b of the vehicle.

Each of the motor MG1 and the motor MG2 is constructed as a well-known synchronous generator-motor that has a rotor provided with permanent magnets stuck to its outer surface, and a stator with three-phase coils. The motors MG1, MG2 send electric power to and receive electric power from the battery 50 via the inverters 41, 42 and the voltage boost circuit 55. In the embodiment, the motors MG1, MG2 and the inverters 41, 42 whose rated value is a maximum input voltage Vset (e.g., 650 V) are employed. The inverters 41, 42 are each constructed of six transistors T11 to T16, T21 to 26, and six diodes D11 to D16, D21 to D26 that are connected in parallel with the transistors T11 to T16, T21 to T26 and in a direction opposite to that of the transistors. The transistors T11 to T16, T21 to T26 are disposed in sets of two transistors of which one is a source side and the other is a sink side with respect to a positive bus 54a and a negative bus 54b that the inverters 41, 42 share as electric power lines 54. A connecting point between the transistors of each pair is connected to a corresponding one of three-phase coils (U-phase, V-phase, W-phase) of the motor MG1 or MG2. Therefore, by controlling the proportions of the durations of an on-state of the transistors T11 to T16, T21 to T26 that make pairs while a voltage is applied between the positive bus 54a and the negative bus 54b, rotating magnetic fields can be formed among the three-phase coils, so that the motors MG1, MG2 can be rotationally driven. Since the inverters 41, 42 share the positive bus 54a and the negative bus 54b, the electric power generated by either one of the motors MG1, MG2 can be supplied to the other motor. In addition, a smoothing capacitor 57 is connected to the positive bus 54a and to the negative bus 54b. The motors MG1, MG2 are driven and controlled by an electronic control unit for the motors (hereinafter, termed the motor ECU) 40. The motor ECU 40 receives inputs signals that are needed in order to drive and control of the motors MG1, MG2, for example, signals from rotational position detection sensors 43, 44 that detect the rotational positions of the rotors of the motors MG1, MG2, phase currents applied to the motors MG1, MG2 which are detected by current sensors (not shown), etc. In turn, the motor ECU 40 outputs switching control signals to the transistors T11 to T16, T21 to T26 of the inverters 41, 42. The motor ECU 40 communicates with the hybrid-vehicle electronic control unit 70. By control signals from the hybrid-vehicle electronic control unit 70, the motor ECU 40 drives and controls the motors MG1, MG2 and outputs data regarding the state of operation of the motors MG1, MG2 to the hybrid-vehicle electronic control unit 70 according to need. Besides, the motor ECU 40 also computes the rotation speeds Nm1, Nm2 of the motors MG1, MG2 on the basis of signals from the rotational position detection sensors 43, 44.

The voltage boost circuit 55, as shown in FIG. 2, is constructed of two transistors T31, T32, two diodes D31, D32 connected to the transistors T31, T32 in parallel and in a direction opposite to that of the transistors T31, T32, and an electric reactor L. The two transistors T31, T32 are connected to the positive bus 54a and the negative bus 54b, respectively, of the inverters 41, 42. The electric reactor L is connected to the connecting point between the two transistors T31, T32. Besides, a positive terminal and a negative terminal of the battery 50 are connected to the electric reactor L and to the negative bus 54b, respectively, via the system main relay 56. Therefore, through the on-off control of the transistors T31, T32, the direct-current electric power of the battery 50 can be increased in voltage and can be supplied to the inverters 41, 42, or the direct-current voltage acting on the positive bus 54a and the negative bus 54b can be decreased in voltage and can be charged into the battery 50. A smoothing capacitor 58 is connected to the electric reactor L and to the negative bus 54b. Hereinafter, the electric power lines 54 side of the voltage boost circuit 55 will be termed the high-voltage system, and the battery 50 side of the voltage boost circuit 55 will be termed the low-voltage system.

Figure 3:
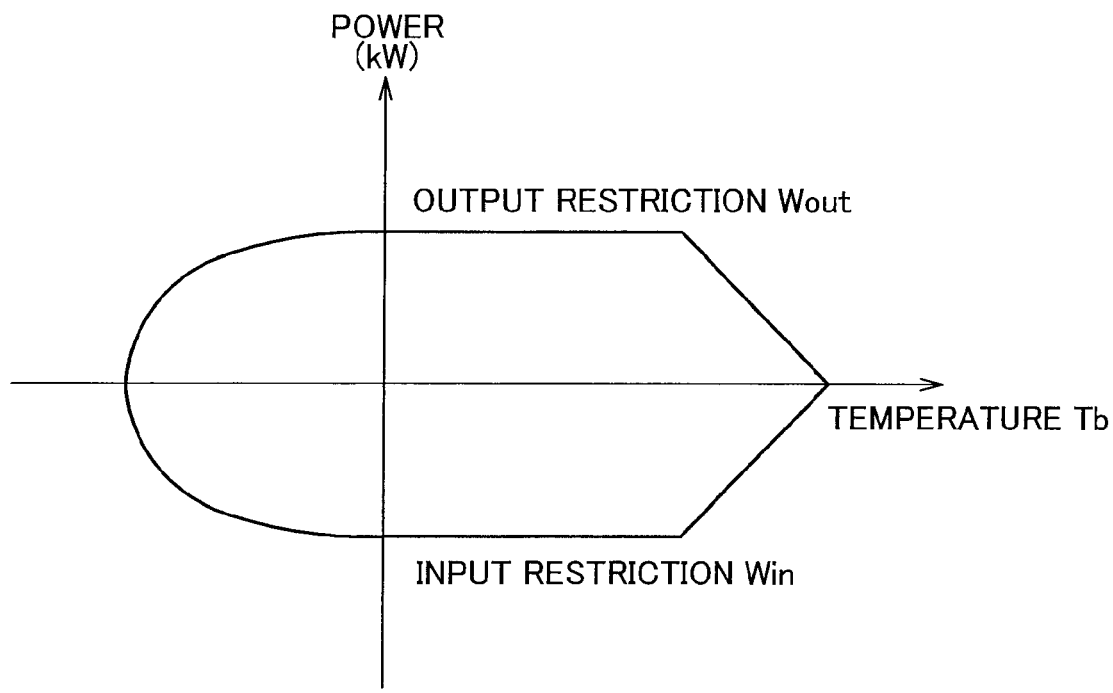
FIG. 3 is an illustrative diagram showing an example of relations of the cell temperature Tb in a battery 50 with the input and output restrictions Win, Wout of the battery 50.
Figure 4:
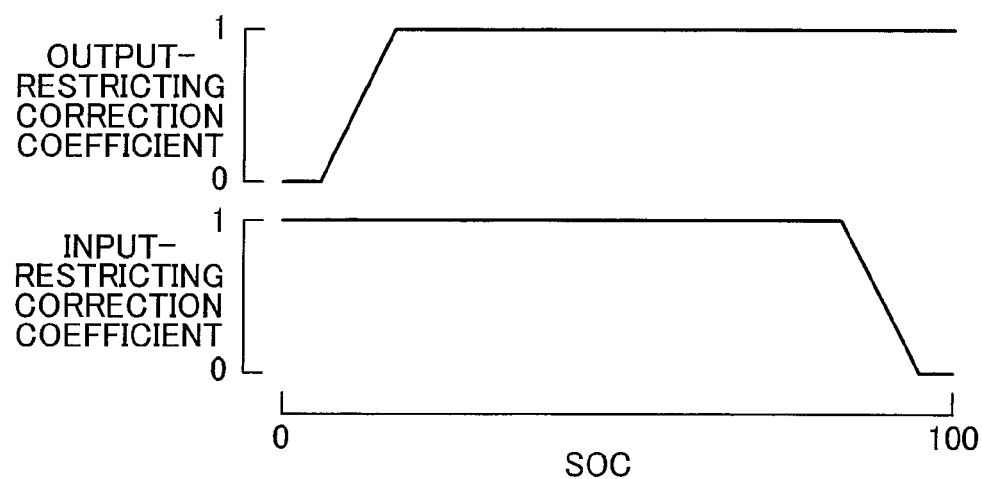
FIG. 4 is an illustrative diagram showing an example of relations of the state of charge (SOC) of the battery 50 with the correction coefficients of the input and output restrictions Win, Wout.

The battery 50 is constructed, for example, as a lithium-ion secondary battery whose rated voltage is 200 V, and is managed by a battery electronic control unit (hereinafter, termed the battery ECU) 52. The battery ECU 52 receives inputs of signals that are needed in order to manage the battery 50, for example, an inter-terminal voltage Vb from a voltage sensor 51a disposed between the terminals of the battery 50, a charge/discharge current Ib from a current sensor 51b attached to an electric power line connected to an output terminal of the battery 50, a cell temperature Tb from a temperature sensor 51c attached to the battery 50, etc. The battery ECU 52 outputs data regarding the state of the battery 50 to the hybrid-vehicle electronic control unit 70 through communication according to need. Besides, the battery ECU 52 computes the state of charge SOC of the battery 50 on the basis of an integrated value of charge/discharge currents Ib detected by the current sensor 51b, or computes input and output restrictions Win, Wout that are maximum permissible electric powers that are allowed to be charged into and discharged from the battery 50 on the basis of the computed state of charge SOC and the cell temperature Tb, in order to manage the battery 50. Incidentally, the input and output restrictions Win, Wout of the battery 50 can be set by setting basic values of the input and output restrictions Win, Wout on the basis of the cell temperature Tb, and setting an output-restricting correction coefficient and an input-restricting correction coefficient on the basis of the state of charge (SOC) of the battery 50, and multiplying the set basic values of the input and output restrictions Win, Wout by the correction coefficients. FIG. 3 shows an example of relations of the cell temperature Tb with the input and output restrictions Win, Wout, and FIG. 4 shows an example of relations of the state of charge (SOC) of the battery 50 with the correction coefficients of the input and output restrictions Win, Wout.

The hybrid-vehicle electronic control unit 70 is constructed as a microprocessor that has a CPU 72 as a central component, and, besides the CPU 72, includes a ROM 74 storing process programs, a RAM 76 that temporarily stores data, as well as input/output ports and communication ports (not shown). Via the input port, the hybrid-vehicle electronic control unit 70 receives inputs of the temperature Tup of the voltage boost circuit 55 from the temperature sensor 55a (e.g., the temperature of the electric reactor L), the voltage of the capacitor 57 from a voltage sensor 57a (hereinafter, termed the voltage VH of the high-voltage system), the voltage of the capacitor 58 from a voltage sensor 58a, an ignition signal from an ignition switch 80, a shift position SP from a shift position sensor 82 that detects the operation position of a shift lever 81, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, the vehicle speed V from a vehicle speed sensor 88, etc. The hybrid-vehicle electronic control unit 70 outputs, via the output port, switching control signals to the transistors T31, T32 of the voltage boost circuit 55, a drive signal to the system main relay 56, etc. The hybrid-vehicle electronic control unit 70, as described above, is connected to the engine ECU 24, the motor ECU 40, and the battery ECU 52, via communication ports, sends data and various control signals to and receives such data and signals from the engine ECU 24, the motor ECU 40, or the battery ECU 52.

The hybrid motor vehicle 20 of this embodiment constructed as described above calculates a required torque that needs to be output to the ring gear shaft 32a as a driving shaft on the basis of the vehicle speed V, and the accelerator operation amount Acc that corresponds to the amount of the depression of the accelerator pedal 83 performed by a driver of the vehicle, and then drives the operation of the engine 22, the motor MG1 and the motor MG2 so that a required motive power that corresponds to the required torque is output to the ring gear shaft 32a. The operation control of the engine 22, the motor MG1 and the motor MG2 includes a torque conversion operation mode of controlling the operation of the engine 22 so that the engine 22 outputs a motive power comparable to the required motive power, and of controlling the driving of the motor MG1 and the motor MG2 so that all the motive power output from the engine 22 is torque-converted by the motive power distribution/integration mechanism 30 and the motors MG1, MG2, and is output to the ring gear shaft 32a, a charge/discharge operation mode of controlling the operation of the engine 22 so that the engine 22 outputs a motive power comparable to the sum of the required motive power and the electric power needed for the charging/discharging of the battery 50, and of controlling the driving of the motor MG1 and the motor MG2 so that the entire amount or a portion of the motive power that is output from the engine 22 while the battery 50 is charged or discharged is torque-converted by the motive power distribution/integration mechanism 30 and the motors MG1, MG2, and a required motive power is output to the ring gear shaft 32a, a motor operation mode of controlling the operation of the engine 22, the motor MG1 and the motor MG2 so that the operation of the engine 22 stops and a motive power comparable to a required motive power is output from the motor MG2 to the ring gear shaft 32a. Incidentally, both the torque conversion operation mode and the charge/discharge operation mode are modes of controlling the engine 22 and the motors MG1, MG2 so that a required motive power is output to the ring gear shaft 32a while the engine 22 is operated, have substantially no difference in the control, and, hereinafter, will be collectively termed the engine operation mode.

Figure 5A:
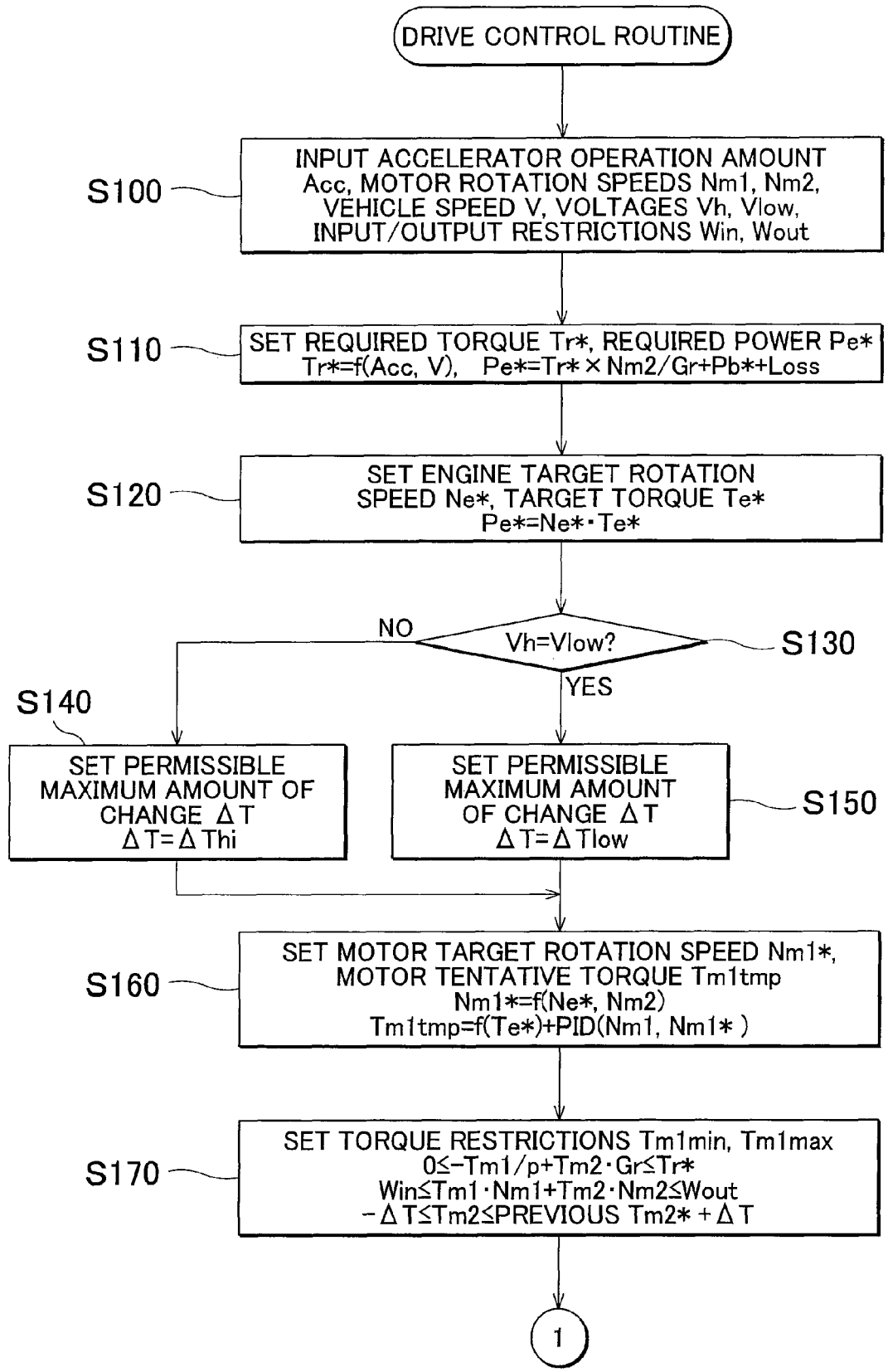
FIGS. 5A and 5B are a flowchart showing an example of a drive control routine that is executed by a hybrid-vehicle electronic control unit 70 in the embodiment.
Figure 5B:
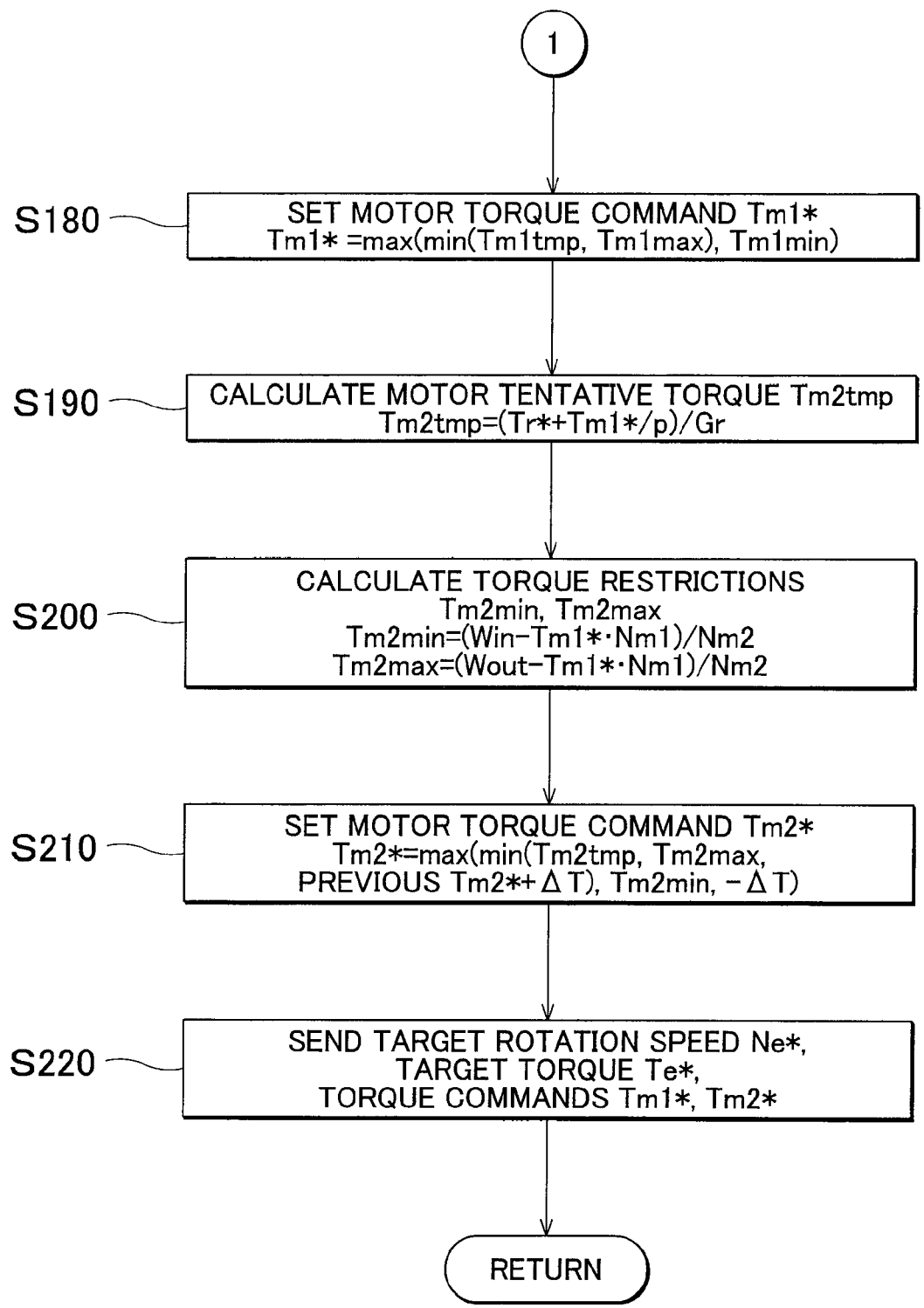

Next, actions of the hybrid motor vehicle 20 of this embodiment constructed as described above will be described. FIGS. 5A and 5B are a flowchart showing an example of a drive control routine that is executed by the hybrid-vehicle electronic control unit 70. This routine is repeatedly executed at every predetermined time (e.g., every several milliseconds).

When the execution of the drive control routine starts, the CPU 72 of the hybrid-vehicle electronic control unit 70 firstly executes a process of inputting data needed for the control, such as the accelerator operation amount Acc from the accelerator pedal position sensor 84, the vehicle speed V from the vehicle speed sensor 88, the rotation speeds Nm1, Nm2 from the motors MG1, MG2, the voltage Vh of the high-voltage system from the voltage sensor 57a, the voltage Vlow of the low-voltage system from the voltage sensor 58a, the input and output restrictions Win, Wout of the battery 50, etc. (step S100). It is to be noted herein that the rotation speeds Nm1, Nm2 of the motors MG1, MG2 are the rotation speeds thereof that are computed on the basis of the rotational positions of the rotors of the motors MG1, MG2 detected by the rotational position detection sensors 43, 44, and that are input from the motor ECU 40 through communication. Besides, the input and output restrictions Win, Wout of the battery 50 are the input and output restrictions that are set on the basis of the cell temperature Tb of the battery 50 and the state of charge (SOC) of the battery 50, and that are input from the battery ECU 52 through communication.

Figure 6:
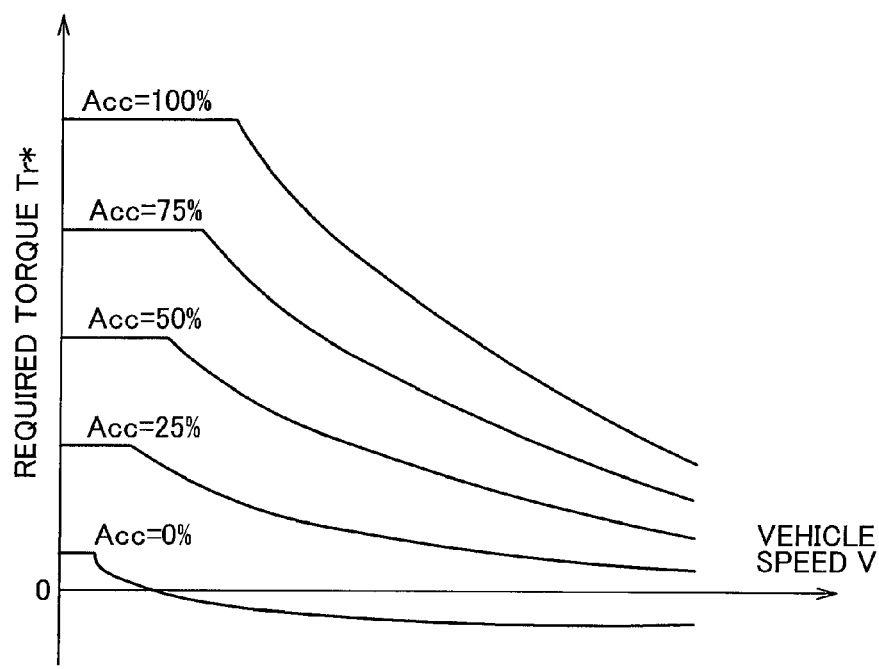
FIG. 6 is an illustrative diagram showing an example of a map for setting a required torque.

After inputting the data in this manner, the CPU 72 sets a required torque Tr* that needs to be output to the ring gear shaft 32a as a driving shaft linked to the driving wheels 63a, 63b, as a torque required of the vehicle, and a required power Pe* that is required of the engine 22, on the basis of the input accelerator operation amount Acc and the input vehicle speed V (step S110). The required torque Tr* in this embodiment is pre-stored in the ROM 74 as a required torque-setting map in which a relation among the accelerator operation amount Acc, the vehicle speed V and the required torque Tr* is determined beforehand. Then, when an accelerator operation amount Acc and a vehicle speed V are given, a required torque Tr* is set by deriving a corresponding required torque Tr* from the stored map. FIG. 6 shows an example of the required torque-setting map. The required power Pe* can be calculated as a sum of a multiplication product of the set required torque Tr* and the rotation speed Nr of the ring gear shaft 32a, the required charge/discharge power Pb* the battery 50 requires, and a loss LOSS. Incidentally, the rotation speed Nr of the ring gear shaft 32a can be found by multiplying the vehicle speed V by a conversion factor k (Nr=k·V), or can also be found by dividing the rotation speed Nm2 of the motor MG2 by the gear ratio Gr of the speed reduction gear 35 (Nr=Nm2/Gr).

Figure 7:
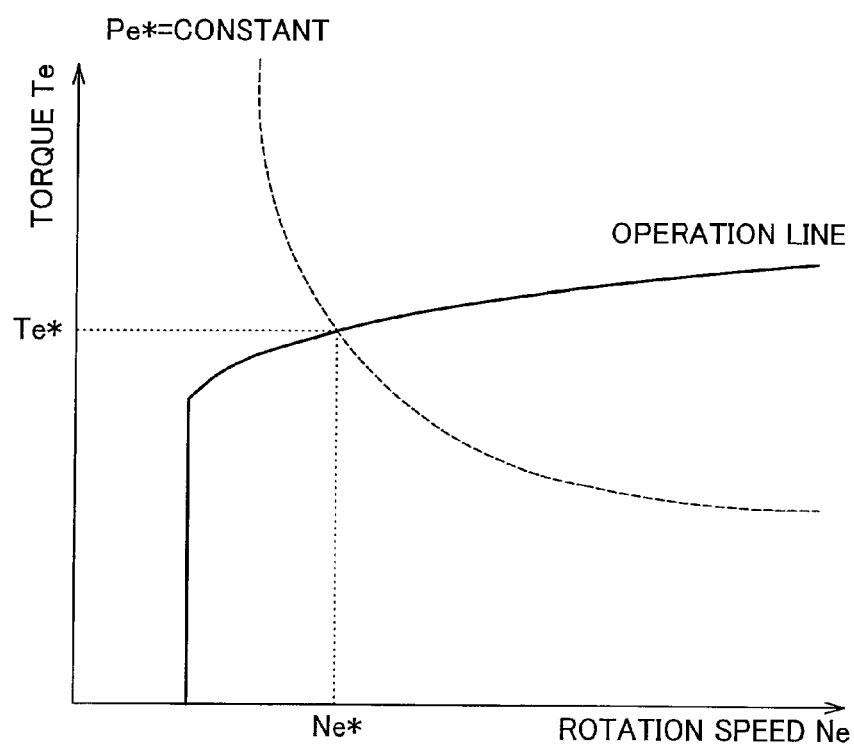
FIG. 7 is an illustrative diagram showing an example of an operation line of an engine 22 and also showing the manner of setting a target rotation speed Ne* and a target torque Te*.

Subsequently, the CPU 72 sets a target rotation speed Ne* and a target torque Te* as an operation point at which the engine 22 needs to be operated, on the basis of the set required power Pe* (step S120). This setting is performed on the basis of an operation line on which the engine 22 is efficiently operated, and the required power Pe*. An example of the operation line of the engine 22, and the manner of setting the target rotation speed Ne* and the target torque Te* are shown in FIG. 7. As shown in FIG. 7, the target rotation speed Ne* and the target torque Te* can be found from an intersection point of the operation line and a curve on which the required power Pe* (Ne*×Te*) is constant.

Next, the CPU 72 determines whether or not the voltage Vh of the high-voltage system and the voltage Vlow of the low-voltage system are equal (step S130). When the voltage Vh of the high-voltage system and the voltage Vlow of the low-voltage system are not equal, the CPU 72 sets a value ΔThi as a permissible maximum amount of change ΔT in the torque of the motor MG2 (step S140). On the other hand, when the voltage Vh of the high-voltage system and the voltage Vlow of the low-voltage system are equal, the CPU 72 sets a value ΔTlow that is smaller than the value ΔThi as a permissible maximum amount of change ΔT in the torque of the motor MG2 (step S150). It is to be noted herein that when the voltage Vh of the high-voltage system and the voltage Vlow of the low-voltage system are equal, the transistor T31 of the voltage boost circuit 55, which is an upper arm thereof, retains the on-state, and therefore the voltage boost circuit 55 is in a state in which the transistors T31, T32 are not switching. If during this state, the torque of the motor MG2 is sharply changed, the current flowing to the inverter 42 sharply increases, giving rise to a risk of occurrence of overcurrent. Therefore, the permissible maximum amount of change in the torque of the motor MG2 needs to be made relatively small. On the other hand, when the voltage Vh of the high-voltage system and the voltage Vlow of the low-voltage system are not equal, the voltage boost circuit 55 assumes a state in which the two transistors T31, T32 are switching. During this time, the current that flows to the inverter 42 when the torque of the motor MG2 is sharply changed is smaller than during the state in which the two transistors T31, T32 are not switching, so that the permissible maximum amount of change in the torque of the motor MG2 can be made relatively large. This is a reason why the permissible maximum amount of change in the torque of the motor MG2 is made different between when the voltage Vh of the high-voltage system and the voltage Vlow of the low-voltage system are equal and when they are not equal.

Figure 8:
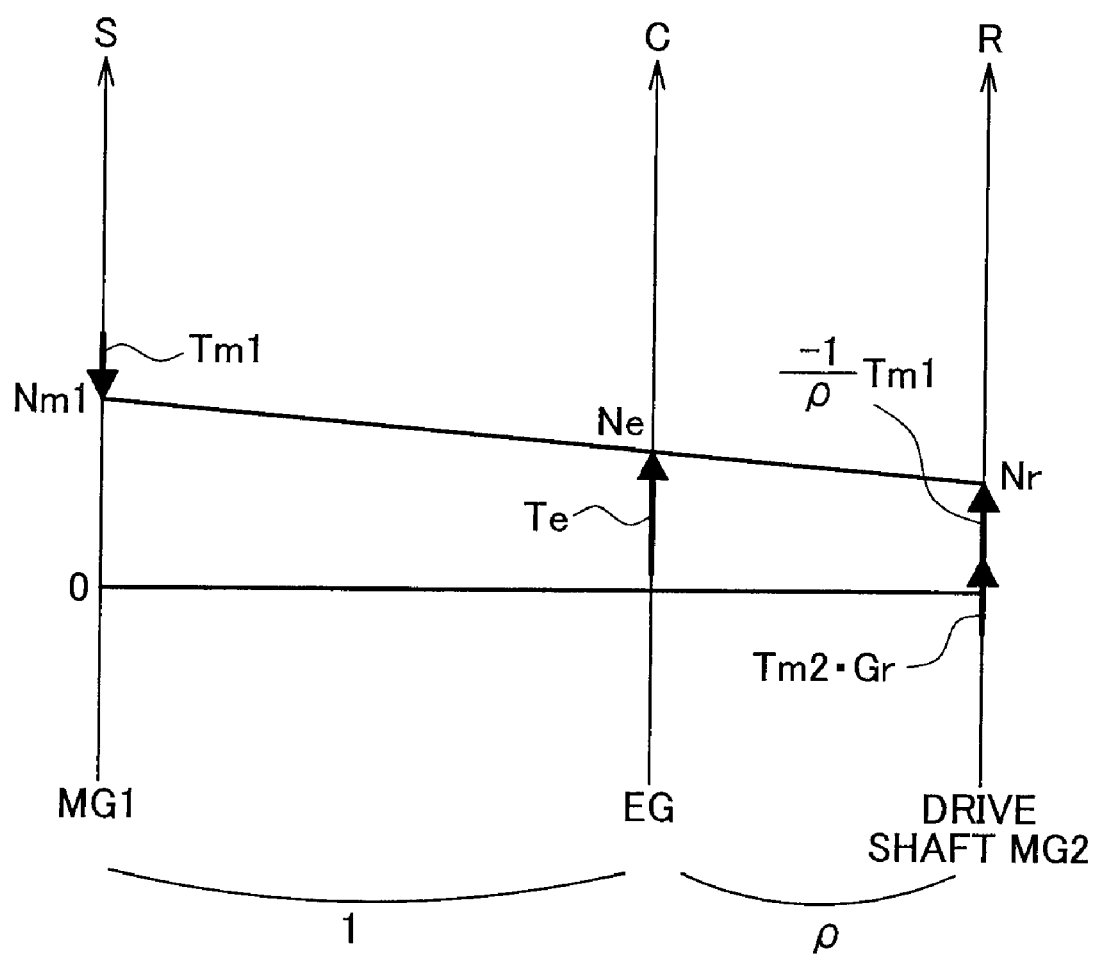
FIG. 8 is an illustrative diagram showing an example of an alignment chart that shows a mechanical relation between the rotation speed and the torques of rotary elements of a motive power distribution/integration mechanism 30 when a vehicle is traveling with the engine 22 outputting power.

After setting the permissible maximum amount of change ΔT in this manner, the CPU 72 calculates a target rotation speed Nm1* of the motor MG1 from the target rotation speed Ne* of the engine 22, the rotation speed Nm2 of the motor MG2, and the gear ratio ρ of the motive power distribution/integration mechanism 30 as in the following expression (1), and then calculates a tentative torque Tm1tmp that is a tentative value of the torque that needs to be output from the motor MG1 on the basis of the calculated target rotation speed Nm1* and the input rotation speed Nm1 of the motor MG1 as in the expression (2) (step S160). The expression (1) is a mechanical relational expression regarding rotary elements of the motive power distribution/integration mechanism 30. An alignment chart showing a mechanical relation between the rotation speed and the torques of rotary elements of the motive power distribution/integration mechanism 30 when the vehicle is traveling with the engine 22 outputting power is shown in FIG. 8. In FIG. 8, the S axis shown on the left shows the rotation speed of the sun gear 31, which is the rotation speed Nm1 of the motor MG1, and the C axis shows the rotation speed of the carrier 34, which is the rotation speed Ne of the engine 22, and the R axis shows the rotation speed Nr of the ring gear 32 obtained by dividing the rotation speed Nm2 of the motor MG2 by the gear ratio Gr of the speed reduction gear 35. The expression (1) can easily be derived by using this alignment chart. In addition, the two bold-line arrows on the R axis respectively show a torque from the torque Tm1 output from the motor MG1 which acts on the ring gear shaft 32a, and a torque from the torque Tm2 output from the motor MG2 which acts on the ring gear shaft 32a via the speed reduction gear 35. Besides, the expression (2) is a relational expression in a feedback control for causing the motor MG1 to rotate at the target rotation speed Nm1*. In the expression (2), "k1" in the second term on the right side is a gain of the proportional, and "k2" in the third term on the right side is a gain of the integral.

$$Nm1^* = Ne^* \cdot (1+\rho)/\rho - Nm2/\rho \tag{1}$$

$$Tm1tmp = \rho \cdot Te^*/(1+\rho) + k1(Nm1^* - Nm1) + k2\int(Nm1^* - Nm1)dt \tag{2}$$

Figure 9:
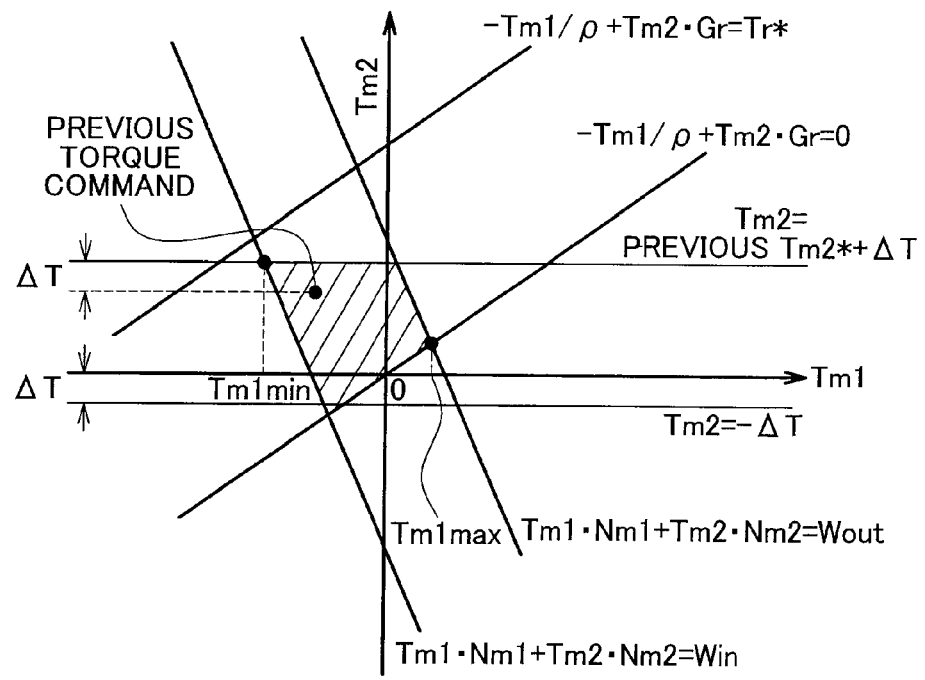
FIG. 9 is an illustrative diagram illustrating the manner of setting torque restrictions Tm1min, Tm1max.

Subsequently, the CPU 72 sets torque restrictions Tm1min, Tm1max as upper and lower limits of the torque that is allowed to be output from the motor MG1 and that satisfies the expressions (3) to (5) (step S170). Then, the CPU restricts the set tentative torque Tm1tmp by the torque restrictions Tm1min, Tm1max as in the expression (6) to set a torque command Tm1* of the motor MG1 (step 180). Herein, the expression (3) expresses a relation (drive torque condition) in which the total sum of the torques that the motor MG1 and the motor MG2 output to the ring gear shaft 32a is within the range from the value 0 to the required torque Tr*. Furthermore, the expression (4) expresses a relation (input/output condition) in which the total sum of the electric powers that the motor MG1 and the motor MG2 input or output is within the range between the input and output restrictions Win, Wout, and the expression (5) expresses a relation (motor torque alteration condition) in which the torque of the motor MG2 is within the range from a value that is smaller than the value 0 by the permissible maximum amount of change ΔT to a value obtained by adding the permissible maximum amount of change ΔT to the torque that the motor MG2 is outputting at the present time (the previous torque command Tm2*). An example of the torque restrictions Tm1min, Tm1max is shown in FIG. 9. The torque restrictions Tm1min, Tm1max can be found as a maximum value and a minimum value of the torque command Tm1* within a region shown by diagonal lines in FIG. 9. In addition, a reason why the value that is smaller than the value 0 by the permissible maximum amount of change ΔT is adopted as the lower limit of the range as a motor torque alteration condition is that overcurrent is unlikely to occur when the torque is made small. If the motor torque alteration condition is not taken into consideration, the torque restrictions Tm1min, Tm1max are set within a parallelogram defined by the drive torque condition and the input/output condition. In the example shown in FIG. 9, if the motor torque alteration condition is not taken into consideration, the torque restriction Tm1min is a smaller value than in the case where the motor torque alteration condition is taken into consideration. Then, if the motor MG1 is driven by setting the torque command Tm1* through the use of a tentative torque Tm1tmp that is restricted by the torque restriction Tm1min, the motor MG1 and the motor MG2 are driven at a drive point at which the output from the motor MG2 is impossible, so that overcurrent can sometimes occur in the inverter 42. In this embodiment, this drawback can be avoided by taking the motor torque alteration condition into account.

$$0 \leq -Tm1/\rho + Tm2 \cdot Gr \leq Tr^* \tag{3}$$

$$Win \leq Tm1 \cdot Nm1 + Tm2 \cdot Nm2 \leq Wout \tag{4}$$

$$-\Delta T \leq Tm2 \leq \text{previous } Tm2^* + \Delta T \tag{5}$$

$$Tm1^* = \max(\min(Tm1tmp, Tm1\max), Tm1\min) \tag{6}$$

Then, the CPU 72 calculates a tentative torque Tm2tmp that is a tentative value of the torque that needs to be output from the motor MG2 by adding the required torque Tr* to the torque command Tm1* divided by the gear ratio ρ of the motive power distribution/integration mechanism 30 and then dividing the sum by the gear ratio Gr of the speed reduction gear 35 as in the following expression (7) (step S190). Subsequently, the CPU 72 calculates torque restrictions Tm2min, Tm2max as the upper and lower limits of the torque that is allowed to be output from the motor MG2 by diving, by the rotation speed Nm2 of the motor MG2, a deviation between the input and output restrictions Win, Wout of the battery 50 and the consumed electric power (generated electric power) of the motor MG1 obtained by multiplying the set torque command Tm1* by the present rotation speed Nm1 of the motor MG1 as in the expression (8) and the expression (9) (step S200). Then, the CPU 72 sets a torque command Tm2* of the motor MG2 by restricting the set tentative torque Tm2tmp by the torque restrictions Tm2min, Tm2max, and the range from the value that is smaller than the value 0 by the permissible maximum amount of change ΔT to a value obtained by adding the permissible maximum amount of change ΔT to the previous torque command Tm2* as in the expression (10) (step S210). The expression (7) can easily be derived from the alignment chart of FIG. 8.

$$Tm2tmp=(Tr^*+Tm1^*/\rho)/Gr \tag{7}$$

$$Tm2\min=(Win-Tm1^* \cdot Nm1)/Nm2 \tag{8}$$

$$Tm2\max=(Wout-Tm1^* \cdot Nm1)/Nm2 \tag{9}$$

$$Tm2^*=\max(\min(Tm2tmp, Tm2\max, \text{previous } Tm2^*+\Delta T), Tm2\min, -\Delta\Delta T) \tag{10}$$

After setting the target rotation speed Ne* and the target torque Te* of the engine 22 and the torque commands Tm1*, Tm2* in this manner, the CPU 72 of the hybrid-vehicle electronic control unit 70 sends the target rotation speed Ne* and the target torque Te* of the engine 22 to the engine ECU 24, and the torque commands Tm1*, Tm2* of the motors MG1, MG2 to the motor ECU 40 (step S220), and then ends the drive control routine. Upon receiving the target rotation speed Ne* and the target torque Te*, the engine ECU 24 performs an intake air amount control, a fuel injection control, an ignition control, etc. of the engine 22 so that the engine 22 is operated at an operation point that is shown by the target rotation speed Ne* and the target torque Te*. Besides, the motor ECU 40, upon receiving the torque commands Tm1*, Tm2*, performs the switching control of the switching elements of the inverters 41, 42 so that the motor MG1 is driven at the torque command Tm1* and the motor MG2 is driven at the torque command Tm2*. Through this control, within the range of the input and output restrictions Win, Wout of the battery 50, the engine 22 can be efficiently operated, and the motors MG1, MG2 can be properly driven, so as to the vehicle be driven, while outputting the required torque Tr* to the ring gear shaft 32a as a driving shaft.

According to the hybrid motor vehicle 20 of the embodiment described above, the engine 22 and the motors MG1, MG2 are controlled by setting a torque command Tm1* that needs to be output from the motor MG1 in order to rotate the engine 22 at a target rotation speed Ne* set on the basis of the required torque Tr* in a range where the relation (drive torque condition) in which the total sum of the torques that the motor MG1 and the motor MG2 output to the ring gear shaft 32a is within the range from the value 0 to the required torque Tr*, the relation (input/output condition) in which the total sum of the electric powers input or output by the motor MG1 and the motor MG2 is within the range between the input and output restrictions Win, Wout, and the relation (motor torque alteration condition) in which the torque of the motor MG2 is within the range from the value that is smaller than the value 0 by the permissible maximum amount of change ΔT to the value obtained by adding the permissible maximum amount of change ΔT to the torque that the motor MG2 is outputting at the present time (the previous torque command Tm2*) are satisfied, and then by setting a torque command Tm2* that needs to be output from the motor MG2 so that the required torque Tr* is output to the ring gear shaft 32a within the range between the input and output restrictions Win, Wout of the battery 50, and within the range from the value that is smaller than the value 0 by the permissible maximum amount of change ΔT to the value obtained by adding the permissible maximum amount of change ΔT to the previous torque command Tm2* when the motor MG1 is driven at the torque command Tm1*. Therefore, the motors MG1, MG2 can be more appropriately driven without causing overcurrent in the inverter 42. Moreover, since the permissible maximum amount of change ΔT is set according to the operating state of the voltage boost circuit 55, the motors MG1, MG2 can be more appropriately driven according to the operating state of the voltage boost circuit 55.

In the hybrid motor vehicle 20 of this embodiment, the torque commands Tm1*, Tm2* of the motors MG1, MG2 are set by taking into account the relation (motor torque alteration condition) in which the torque of the motor MG2 is within the range from the value that is smaller than the value 0 by the permissible maximum amount of change ΔT to the value obtained by adding the permissible maximum amount of change ΔT to the torque that the motor MG2 is presently outputting, in addition to the drive torque condition and the input/output condition. However, besides these conditions, a relation (a motor torque alteration condition for the motor MG1) in which the torque of the motor MG1 is within a range from a value obtained by subtracting the permissible maximum amount of change ΔT1 from the torque that the motor MG1 is presently outputting to the permissible maximum amount of change ΔT1, which is positive, as shown in the expression (11) may also be taken into account in setting the torque commands Tm1*, Tm2* of the motors MG1, MG2. This makes it possible to more appropriately drive the motors MG1, MG2 without causing overcurrent in the inverter 41.

$$\text{the previous } Tm1^* - \Delta T1 \leq Tm1 \leq \Delta T1 \tag{11}$$

In the hybrid motor vehicle 20 of this embodiment, the expression (3) is used as the relation (drive torque condition) in which the total sum of the torque that the motor MG1 or the motor MG2 outputs to the ring gear shaft 32a is within the range from the value 0 to the required torque Tr*. However, it is also permissible to use a coefficient K that factors in the inertia of the rotation systems of the motor MG1, the motor MG2 and the engine 22 as shown in the following expression (12). This also makes it possible to take into account that the torque output to the ring gear shaft 32a as a driving shaft changes due to changes in the rotation speeds of the motor MG1, the motor MG2 and the engine 22. Incidentally, the coefficient K is set so as to become the larger the larger the changes in the rotation speeds of the motor MG1, the motor MG2 and the engine 22.

$$0 \leq -(1-k) \cdot Tm1/\rho + Tm2 \cdot Gr \leq Tr^* \tag{12}$$

Although the hybrid motor vehicle 20 of this embodiment is provided with the voltage boost circuit 55 that boosts the voltage on the battery 50 side and supplies the boosted voltage to the motor MG1 or the motor MG2, such a voltage boost circuit 55 may be omitted.

Although in the hybrid motor vehicle 20 of the foregoing embodiment, the motor MG2 is attached to the ring gear shaft 32a as a driving shaft via the speed reduction gear 35, the motor MG2 may also be attached directly to the ring gear shaft 32a, or the motor MG2 may also be attached to the ring gear shaft 32a via a transmission of two speeds, three speeds, four speeds, etc., instead of the speed reduction gear 35.

Figure 10:
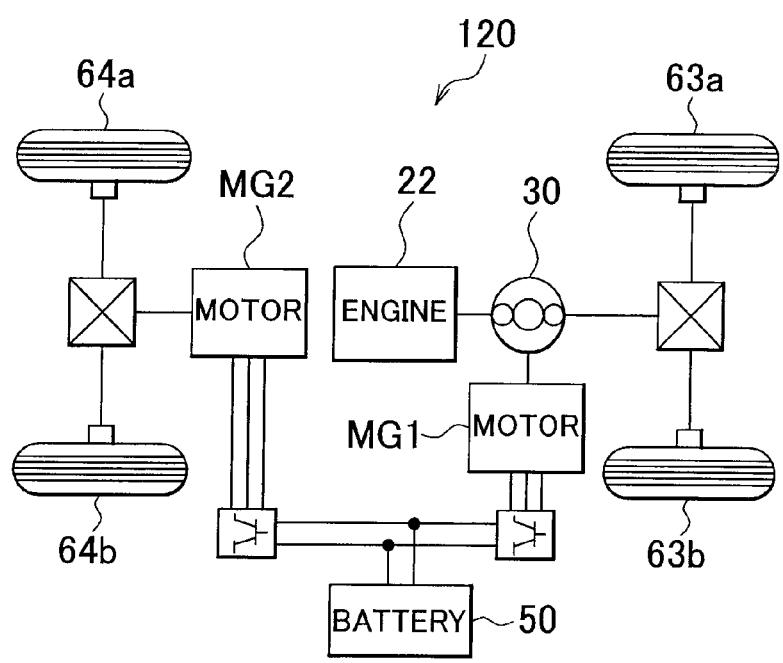
FIG. 10 is a construction diagram showing a general construction of a hybrid motor vehicle 120 of a modification.

In the hybrid motor vehicle 20 of the embodiment, the motive power of the motor MG2 is changed in speed by the speed reduction gear 35, and then is output to the ring gear shaft 32a. However, if it is considered that the road wheels connected to axle shafts different from those of the driving wheels 63a, 63b are also connected to the driving wheels 63a, 63b via a road surface, the wheels connected to the axle shafts different from those of the driving wheels 63a, 63b can be considered to be also connected to the ring gear shaft 32a as a driving shaft. Therefore, as exemplified by a hybrid motor vehicle 120 of a modification shown in FIG. 10, the motive power of the motor MG2 may also be output to axle shafts (axle shafts connected to road wheels 64a, 64b in FIG. 10) different from axle shafts to which the ring gear shaft 32a is connected (axle shafts to which driving wheels 63a, 63b are connected).

While the hybrid motor vehicle 20 as a form of carrying out the invention has been described, the invention is not limited to the foregoing hybrid motor vehicle 20. For example, the invention may also be applied to a form of a vehicle other than the motor vehicle, a form of a motive power output device mounted in a vehicle other than the hybrid motor vehicle 20 or the motor vehicles, and may also be applied to a form of a motive power output device that is not mounted in a vehicle. Besides, the invention may also be applied to a form of a control method for the motive power output device.

Correspondence relations between major elements of the embodiment and major elements of the invention will be described. The engine 22 in the embodiment may be considered to correspond to an "internal combustion engine" in the invention. Besides, the motive power distribution/integration mechanism 30 and the motor MG1 may also be considered to correspond to "electric power-motive power input/output device" in the invention, and the motor MG2 may also be considered to correspond to an "electric motor", and the battery 50 may also be considered to correspond to an "electric storage device". Furthermore, the battery ECU 52 that computes the input and output restrictions Win, Wout that are a maximum permissible electric power that is allowed to be used for the charging or discharging of the battery 50 on the basis of the cell temperature Tb of the battery 50 and the state of charge (SOC) of the battery 50 based on an integrated value of the charge/discharge currents detected by the current sensor may also be considered to correspond to an "input/output restriction setting device", and the vehicle speed sensor 88 may also be considered to correspond to a "vehicle speed detection device". Still further, the hybrid-vehicle electronic control unit 70 that executes the process of step S110 in the drive control routine in FIG. 5A in which the required torque Tr* is set on the basis of the accelerator operation amount Acc and the vehicle speed V may also be considered to correspond to a "required torque setting device". Then, the hybrid-vehicle electronic control unit 70 executing the process of steps S110 to S220 in the drive control routine in FIGS. 5A and 5B, the engine ECU 24 that controls the engine 22 on the basis of the target rotation speed Ne* and the target torque Te*, and the motor ECU 40 that controls the motors MG1, MG2 on the basis of the torque commands Tm1*, Tm2* may also be considered to correspond to a "control device" in the invention. The hybrid-vehicle electronic control unit 70 executing the process of steps S110 to S220 in the drive control routine in FIGS. 5A and 5B will be described further in detail. That is, in steps S110 to S220 in drive control routine in FIGS. 5A and 5B, the hybrid-vehicle electronic control unit 70 sets a torque command Tm1* that needs to be output from the motor MG1 in order to rotate the engine 22 at a target rotation speed Ne* at a target operation point (the target rotation speed Ne*, the target torque Te*) set on the basis of the required torque Tr* in a range where the relation (drive torque condition) in which the total sum of the torques that the motor MG1 and the motor MG2 output to the ring gear shaft 32a is within the range from the value 0 to the required torque Tr*, the relation (input/output condition) in which the total sum of the electric powers input or output by the motor MG1 and the motor MG2 is within the range between the input and output restrictions Win, Wout, and the relation (motor torque alteration condition) in which the torque of the motor MG2 is within the range from the value that is smaller than the value 0 by the permissible maximum amount of change ΔT to a value obtained by adding the permissible maximum amount of change ΔT to the torque that the motor MG2 is outputting at the present time (the previous torque command Tm2*) are satisfied. Furthermore, the hybrid-vehicle electronic control unit 70 sets a torque command Tm2* that needs to be output from the motor MG2 so that the required torque Tr* is output to the ring gear shaft 32a within the range between the input and output restrictions Win, Wout of the battery 50, and within the range from the value that is smaller than the value 0 by the permissible maximum amount of change ΔT to the value obtained by adding the permissible maximum amount of change ΔT to the previous torque command Tm2* when the motor MG1 is driven at the torque command Tm1*. Then, the hybrid-vehicle electronic control unit 70 transmits the set target rotation speed Ne* and the set target torque Te* to the engine ECU 24, and transmits the set torque commands Tm1*, Tm2* to the motor ECU 40. Besides, the voltage boost circuit 55 may also be considered to correspond to a "voltage adjustment device in the invention, and the motor MG1 may also be considered to correspond to an "electric generator", and the motive power distribution/integration mechanism 30 may also be considered to correspond to a "three-shaft type motive power input/output device". A pair-rotor electric motor may also be considered to correspond to an "electric power-motive power input/output device".

Herein the "internal combustion engine" is not limited to internal combustion engines that output motive power using a hydrocarbon-based fuel, such as gasoline, light oil, etc., but may be any type of internal combustion engine, including a hydrogen engine and the like. The "electric power-motive power input/output device" is not limited to a combination of the motive power distribution/integration mechanism 30 and the motor MG1, or the pair-rotor electric motor, but may be of any type as long as the device is connected to the driving shaft and is also connected to the output shaft of the internal combustion engine so as to be rotatable independently of the driving shaft, and is able to input/output motive power from/to the driving shaft and the output shaft in conjunction with the input/output of electric power and motive power. The "electric motor" is not limited to the motor MG2 constructed as a synchronous generator-motor, but may be any type of electric motor as long as the electric motor is able to input and output motive power from and to the driving shaft, such as an induction motor or the like. The "electric storage device" is not limited to the battery 50 as a secondary cell, but may be of any type, for example, a capacitor or the like, as long as the electric storage device is able to send and receive electric power to and from the electric power-motive power input/ output device and the electric motor. The "input/output restriction setting device" is not limited to the device that computes the input and output restrictions Win, Wout on the basis of the state of charge (SOC) of the battery 50 and the cell temperature Tb of the battery 50, but may be any device, such as a device that computes the input and output restrictions on the basis of not only the state of charge (SOC) and the cell temperature Tb but also, for example, the internal resistance of the battery 50, or the like, as long as the device sets input and output restrictions that are a maximum permissible electric power that is allowed to be charged into or discharged from the electric storage device on the basis of the state of the electric storage device. The "required torque setting device" is not limited to the device that sets the required torque Tr* on the basis of the accelerator operation amount Acc and the vehicle speed V, but may be any device, such as a device that sets a required torque on the basis of only the accelerator operation amount Acc, a device that sets a required torque on the basis of the position of the vehicle on a travel path if the travel path is pre-set, etc., as long as the device sets a required drive force that is required of the driving shaft. The "control device" is not limited to a combination made up of the hybrid-vehicle electronic control unit 70, the engine ECU 24 and the motor ECU 40, but may also be, for example, constructed of a single electronic control unit. Besides, the "control device" is not limited to the device that controls the engine 22 and the motors MG1, MG2 by setting a torque command Tm1* that needs to be output from the motor MG1 in order to rotate the engine 22 at a target rotation speed Ne* at a target operation point (the target rotation speed Ne*, the target torque Te*) set on the basis of the required torque Tr* in a range where the relation (drive torque condition) in which the total sum of the torques that the motor MG1 and the motor MG2 output to the ring gear shaft 32*a* is within the range from the value 0 to the required torque Tr*, the relation (input/output condition) in which the total sum of the electric powers that the motor MG1 and the motor MG2 input and output is within the range between the input and output restrictions Win, Wout, and the relation (motor torque alteration condition) in which the torque of the motor MG2 is within the range from the value that is smaller than the value 0 by the permissible maximum amount of change ΔT to a value obtained by adding the permissible maximum amount of change ΔT to the torque that the motor MG2 is outputting at the present time (the previous torque command Tm2*) are satisfied, and then by setting a torque command Tm2* that needs to be output from the motor MG2 so that the required torque Tr* is output to the ring gear shaft 32*a* within the range between the input and output restrictions Win, Wout of the battery 50, and within the range from the value that is smaller than the value 0 by the permissible maximum amount of change ΔT to the value obtained by adding the permissible maximum amount of change ΔT to the previous torque command Tm2* when the motor MG1 is driven at the torque command Tm1*. On the contrary, the control device may be any device, for example, a device that controls the engine 22 and the motors MG1, MG2 by setting torque commands Tm1*, Tm2* of the motors MG1, MG2 by taking into account not only the drive torque condition and the input/output condition but also a relation (a motor torque alteration condition for the motor MG1) in which the change in the torque of the motor MG1 is within a range from a value obtained by subtracting the permissible maximum amount of change ΔT1 from the torque that the motor MG1 is outputting to the permissible maximum amount of change ΔT1 as a positive value, or the like, as long as the device operates an internal combustion engine on the basis of a predetermined constraint in a range where setting conditions, including an input/output condition that the sum of the electric generator input/output electric power input to or output from an electric generator and an electric motor input/output electric power input to or output from the electric motor be within the range between the input and output restrictions of the electric storage device, a drive torque condition that the sum of the torque that acts on the driving shaft on the basis of the torque output from the electric generator and the torque that acts on the driving shaft based on the torque output from the electric motor be within the range from the value 0 to the required torque, and an electric motor torque alteration condition that the torque output from the electric motor be within a permissible torque range in which the alteration from the torque that the electric motor is outputting is permitted, are satisfied, and which also controls the internal combustion engine, the electric generator, and the electric motor so that the required torque is output to the driving shaft. The "voltage adjustment device" is not limited to the voltage boost circuit 55, but may be any device as long as the device allows the sending and receiving of electric power among an electric storage device, an electric generator and an electric motor by adjusting the voltages of the electric generator side and the electric motor side relative to the voltage of the electric storage device side. The "electric generator" is not limited to the motor MG1 that is constructed as a synchronous generator-motor, but may be any type of electric generator, such as an induction electric motor or the like, as long as the generator is able to input and output motive power. The "three-shaft type motive power input/output device" is not limited to the foregoing motive power distribution/integration mechanism 30, but may be any device, such as a device that employs a double-pinion type planetary gear mechanism, a device that includes a combination of a plurality of planetary gear mechanisms and that is connected to four or more shafts, a device that is different in operation and action from planetary gears, such as a differential gear or the like, etc., as long as the device is connected to three shafts, that is, a driving shaft, an output shaft, and a rotating shaft of an electric generator, and inputs or outputs motive power from or to one of the three shafts on the basis of the motive power input to or output from the other two shafts.

Incidentally, the foregoing correspondence relations between major elements of the embodiment and major elements of the invention do not limit the elements of the invention, since the embodiments are mere examples for concretely describing best modes for carrying out the invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention is applicable to industries that manufacture motive power output devices, vehicles equipped with motive power output devices, etc.

What is claimed is:

1. A motive power output device that outputs motive power to a driving shaft, comprising:
    an internal combustion engine;
    an electric generator to which motive power is input, and which outputs motive power;
    a three-shaft type motive power input/output device which is connected to three shafts that are the driving shaft, an output shaft of the internal combustion engine, and a rotating shaft of the electric generator, wherein motive power is input to the three-shaft type motive power input/output device from one of the three shafts or the three-shaft type motive power input/output device outputs motive power to one of the three shafts based on the motive power input from or output to the other two shafts of the three shafts;

an electric motor to which motive power is input from the driving shaft, and which outputs motive power to the driving shaft;

an electric storage device capable of sending electric power to and receiving electric power from the electric generator and the electric motor;

an input/output restriction setting device that sets an input/output restriction as a maximum electric power that is allowed to be charged into and discharged from the electric storage device based on a state of the electric storage device;

a required torque setting device that sets a required torque that is required of the driving shaft; and a control device which operates the internal combustion engine based on a predetermined constraint, and controls the internal combustion engine, the electric generator, and the electric motor so that the set required torque is output to the driving shaft, in a range where setting conditions are satisfied, where the setting conditions include an input/output condition that a sum of an electric generator input/output electric power input to or output from the electric generator and an electric motor input/output electric power input to or output from the electric motor be within a range between the input and output restrictions set by the input/output restriction setting device, a drive torque condition that a sum of a torque that acts on the driving shaft based on a torque output from the electric generator and a torque that acts on the driving shaft based on a torque output from the electric motor be within a range from a value 0 to the required torque set by the required torque setting device, and an electric motor torque alteration condition that a torque to be output from the electric motor be within a range defined by a torque that is larger by an alteration torque than the torque that the electric motor is outputting and a torque that is smaller than the value 0 by the alteration torque, as a permissible torque range in which alteration from the torque that the electric motor is outputting is permitted;

a voltage adjustment device that allows electric power to be sent and received between the electric storage device, the electric generator and the electric motor by adjusting a voltage of a side of the electric generator and the electric motor relative to a voltage of a side of the electric storage device, wherein the electric motor torque alteration condition is a condition in which the permissible torque range is a range obtained by using a first torque as the alteration torque when the voltage of the side of the electric generator and the electric motor is made equal to the voltage of the side of the electric storage device by the voltage adjustment device, and is a condition in which the permissible torque range is a range obtained by using a second torque that is larger than the first torque as the alteration torque when the voltage of the side of the electric generator and the electric motor is made higher than the voltage of the side of the electric storage device by the voltage adjustment device.

2. The motive power output device according to claim 1, wherein the control device controls the internal combustion engine, the electric generator, and the electric motor, using as one of the setting conditions an electric generator torque alteration condition that the torque that the electric generator outputs be within a range in which alteration from the torque that the electric generator is outputting is permitted.

3. The motive power output device according to claim 1, wherein the control device sets a target operation point of the internal combustion engine based on the set required torque and the predetermined constraint, and operates the internal combustion engine at the set target operation point within a range where the setting conditions are satisfied, and sets a torque command of the electric generator and a torque command of the electric motor so that the set required torque is output to the driving shaft, and drives the electric generator and the electric motor by the set torque commands, and controls the internal combustion engine, the electric generator, and the electric motor so that the internal combustion engine is operated by the predetermined constraint.

4. A vehicle provided with the motive power output device according to claim 1, in which an axle shaft is linked to the driving shaft.

5. A control method for a motive power output device that includes:

an internal combustion engine;

an electric generator to which motive power is input, and which outputs motive power;

a three-shaft type motive power input/output device which is connected to three shafts that are the driving shaft, an output shaft of the internal combustion engine, and a rotating shaft of the electric generator, wherein motive power is input to the three-shaft type motive power input/output device from one of the three shafts or the three-shaft type motive power input/output device outputs motive power to one of the three shafts, based on the motive power input from or output to the other two shafts of the three shafts;

an electric motor to which motive power is input from the driving shaft, and which outputs motive power to the driving shaft;

an electric storage device capable of sending electric power to and receiving electric power from the electric generator and the electric motor; and a voltage adjustment device that allows electric power to be sent and received between the electric storage device, the electric generator and the electric motor by adjusting a voltage of a side of the electric generator and the electric motor relative to a voltage of a side of the electric storage device, the control method comprising:

operating the internal combustion engine based on a predetermined constraint, and controlling the internal combustion engine, the electric generator, and the electric motor so that the set required torque is output to the driving shaft, in a range where setting conditions are satisfied, wherein the setting conditions include an input/output condition that a sum of an electric generator input/output electric power input to or output from the electric generator and an electric motor input/output electric power input to or output from the electric motor be within a range between the input and output restrictions as a maximum electric power that is allowed to be charged into and discharged from the electric storage device based on a state of the electric storage device, a drive torque condition that a sum of a torque that acts on the driving shaft based on a torque output from the electric generator and a torque that acts on the driving shaft based on a torque output from the electric motor be within a range from a value 0 to a required torque that is required of the driving shaft, and an electric motor torque alteration condition that a torque to be output from the electric motor be within a range defined by a torque that is larger by an alteration torque than the torque that the electric motor is outputting, and a torque that is smaller than the value 0 by the alteration torque, as a permissible torque range in which alteration from the torque that the electric motor is outputting is permitted, wherein the electric motor torque alteration condition is a condition in which the permissible torque range is a range obtained by using a first torque as the alteration torque when the voltage of the side of the electric generator and the electric motor is made equal to the voltage of the side of the electric storage device by the voltage adjustment device, and is a condition in which the permissible torque range is a range obtained by using a second torque that is larger than the first torque as the alteration torque when the voltage of the side of the electric generator and the electric motor is made higher than the voltage of the side of the electric storage device by the voltage adjustment device.

* * * * *

UNITED STATES PATENT AND TRADEMARK OFFICE
CERTIFICATE OF CORRECTION

PATENT NO. : 7,836,985 B2
APPLICATION NO. : 12/404644
DATED : November 23, 2010
INVENTOR(S) : Takao Itoh It is certified that error appears in the above-identified patent and that said Letters Patent is hereby corrected as shown below:

| Column | Line | |
|---|---|---|
| 3 | 36 | Change "toque" to --torque--. |
| 13 | 9 | Change "diving" to --dividing--. |
| 13 | 31 | Change "$-\Delta\Delta T \ (10)$" to -- $-\Delta T \ (10)$--. |
| 14 | 58 | After "become" delete "the". |

Signed and Sealed this
Fifth Day of April, 2011

David J. Kappos
*Director of the United States Patent and Trademark Office*